United States Patent
Yang et al.

(10) Patent No.: US 10,243,190 B2
(45) Date of Patent: Mar. 26, 2019

(54) BATTERY SPACER, ELECTRIC CORE PROTECTION ASSEMBLY AND POWER BATTERY

(71) Applicant: BYD COMPANY LIMITED, Shenzhen, Guangdong (CN)

(72) Inventors: Keli Yang, Shenzhen (CN); Luxia Jiang, Shenzhen (CN); Shichao Hu, Shenzhen (CN); Jianhua Zhu, Shenzhen (CN)

(73) Assignee: BYD Company Limited, Shenzhen, Guangdong (CN)

(*) Notice: Subject to any disclaimer, the term of this patent is extended or adjusted under 35 U.S.C. 154(b) by 149 days.

(21) Appl. No.: 15/403,853

(22) Filed: Jan. 11, 2017

(65) Prior Publication Data

US 2017/0125769 A1 May 4, 2017

Related U.S. Application Data

(63) Continuation of application No. PCT/CN2015/078109, filed on Apr. 30, 2015.

(30) Foreign Application Priority Data

Jul. 31, 2014 (CN) .......................... 2014 1 0371126
Jul. 31, 2014 (CN) ..................... 2014 2 0427972 U

(51) Int. Cl.
*H01M 2/18* (2006.01)
*H01M 2/02* (2006.01)
(Continued)

(52) U.S. Cl.
CPC ........... *H01M 2/18* (2013.01); *H01M 2/0242* (2013.01); *H01M 2/14* (2013.01); *H01M 2/362* (2013.01); *H01M 2220/20* (2013.01)

(58) Field of Classification Search
CPC .. H01M 2220/20; H01M 2/0242; H01M 2/14; H01M 2/18; H01M 2/362; H01M 2/10; H01M 2/36
See application file for complete search history.

(56) References Cited

U.S. PATENT DOCUMENTS

2009/0311593 A1 12/2009 Park
2010/0104927 A1 4/2010 Albright
(Continued)

FOREIGN PATENT DOCUMENTS

CN 201345371 Y 11/2009
CN 201430167 Y 3/2010
(Continued)

OTHER PUBLICATIONS

International Search Report and Written Opinion for Application No. PCT/CN2015/078109, dated Jul. 13, 2015, 11 pages.

*Primary Examiner* — Barbara L Gilliam
*Assistant Examiner* — Adam A Arciero
(74) *Attorney, Agent, or Firm* — Sheppard, Mullin, Richter & Hampton LLP

(57) ABSTRACT

A battery spacer, an electric core protection assembly having the battery spacer and a power battery are provided. The battery spacer includes: a spacer body; a plurality of protrusions, each protrusion protruding from an inner surface of the spacer body, extending in a longitudinal direction of the spacer body, and formed by recessing a portion of an outer surface of the spacer body; a plurality of grooves formed in the outer surface of the spacer body, each groove corresponding to one of the plurality of protrusions respectively and formed by recessing the portion of the outer surface of the spacer body; and a plurality of liquid guiding slots formed in the outer surface of the spacer body and extending from the grooves to an edge of the spacer body respectively.

18 Claims, 3 Drawing Sheets

(51) Int. Cl.
*H01M 2/36* (2006.01)
*H01M 2/14* (2006.01)

(56) References Cited

U.S. PATENT DOCUMENTS

| | | |
|---|---|---|
| 2011/0052960 A1 | 3/2011 | Kwon et al. |
| 2011/0104540 A1 | 5/2011 | Lee et al. |
| 2011/0311851 A1 | 12/2011 | Shinoda et al. |
| 2012/0058391 A1* | 3/2012 | Jiang ................ H01M 2/10 429/186 |
| 2013/0122346 A1* | 5/2013 | Jiang .............. H01M 2/1016 429/143 |
| 2013/0252045 A1 | 9/2013 | Park et al. |

FOREIGN PATENT DOCUMENTS

| | | |
|---|---|---|
| CN | 201438481 U | 4/2010 |
| CN | 201936935 U | 8/2011 |
| CN | 202454638 U | 9/2012 |
| CN | 204144386 U | 2/2015 |
| JP | 2013-089558 A | 5/2013 |

\* cited by examiner

BATTERY SPACER, ELECTRIC CORE PROTECTION ASSEMBLY AND POWER BATTERY

CROSS-REFERENCE TO RELATED APPLICATIONS

This application is a continuation application of International Application No. PCT/CN2015/078109, filed on Apr. 30, 2015, which is based on and claims priority to and benefits of Chinese Patent Applications No. 201410371126.X and 201420427972.4, both filed with the State Intellectual Property Office (SIPO) of the People's Republic of China on Jul. 31, 2014. The entire content of the above-referenced applications are incorporated herein by reference.

FIELD

Embodiments of the present disclosure generally relate to power battery technology field, and more particularly to a battery spacer, an electric core protection assembly having the battery spacer, and a power battery.

BACKGROUND

With non-renewable resources such as petroleum drying up and the environmental pollution becoming serious, people pay more attention to new energy vehicles. The power battery is a heart part of the new energy vehicle. Since vehicles have great maneuverability and may be often subject to vibration and impacts, requirements for safety and reliability of the power battery are strict.

In the related art, the power battery generally includes a plurality of electric cores formed by overlapping a plurality of layers of flexible members, electrolyte, a battery cover and a shell. The electric cores are insulated with the battery cover and/or the shell.

Nowadays, the electric core generally has a better structure in which the electrode (both anode and cathode) sheet is provided with a coated area and an uncoated area in its width direction, a separator is disposed between the anode sheet and the cathode sheet, the coated areas of the anode sheet and the cathode sheet are winded with respect to the separator to obtain the electric core, and also, the uncoated area is winded to form a winding tab configured to lead out large current, and then a middle part of the winding tab is laminated such that it is convenient for the winding tab to be welded with an electrode terminal to lead out current.

The power battery has a high capacity and a large volume, and each electric core therein also has a large volume. Meanwhile, since each electric core is formed by the plurality of layers of flexible members, the electric core is easy to be damaged during turnover thereof. For batteries including a plurality of electric cores, combination and position of the plurality of the electric cores are difficult. During assembling of the battery, for example while the shell is being fitted over the electric cores, frictions between the electric cores and a wall of the shell may bring great damage to the electric cores. In use of the battery, vibration and jolt of the vehicle may cause the electric cores to move in the shell, which may cause damage to the electric cores, thus resulting in following problems which may bring hidden safety hazard to the battery: a current collector may be broken, the separator may shrink, materials of the electrode plate may peel off, and welding points may be destroyed by the impacts.

SUMMARY

In viewing thereof, the present disclosure is directed to solve at least one problem existing in the related art, for example, it is difficult for a conventional battery spacer to position an electric core stably.

Embodiments of a first aspect of the present disclosure provide a battery spacer. The battery spacer includes: a spacer body; a plurality of protrusions, each protrusion protruding from an inner surface of the spacer body, extending in a longitudinal direction of the spacer body, and formed by recessing a portion of an outer surface of the spacer body; a plurality of grooves formed in the outer surface of the spacer body, each groove corresponding to one of the plurality of protrusions respectively and formed by recessing the portion of the outer surface of the spacer body; a plurality of liquid guiding slots formed in the outer surface of the spacer body and extending from the grooves to an edge of the spacer body respectively.

The battery spacer according to embodiments of the present disclosure is suitable to be used in a lithium ion secondary battery with a square configuration which is coupled with more than one tab in a same end of the battery. With the battery spacer according to embodiments of the present disclosure, on one hand, the tab coupled to the electric core may be protected and positioned by the protrusions on the inner surface of the spacer body; on the other hand, the tab may be insulated from the shell by the battery spacer, and thus a short circuit problem caused by a direct contact between the tab and the shell may be avoided, and safety of the battery may be improved greatly.

Meanwhile, the plurality of grooves formed in the outer surface of the spacer body and by recessing the portion of the outer surface of the spacer body may reduce a weight of the battery spacer. Thus, in an actual production process, after the battery spacer is assembled within the battery and the liquid electrolyte is injected, the liquid electrolyte may flow into an area between the battery spacer and the shell, and in particular congregate in the grooves. In order to avoid a congregation of the liquid electrolyte in the grooves, the plurality of liquid guiding slots are provided, which are formed in the outer surface of the spacer body and extending from the grooves to an edge of the spacer body respectively, and the congregated liquid electrolyte may flow out along the slot, thus improving the utilization of the liquid electrolyte.

In some embodiments, the slot extends in the longitudinal direction of the spacer body.

In some embodiments, the battery spacer further includes at least one reinforcing plate disposed within one of the plurality of grooves.

In some embodiments, the reinforcing plate is disposed in a lateral direction of the spacer body, and defines an upper surface obliquely extending downwards from inside to outside and a lower surface.

In some embodiments, the lower surface of the reinforcing plate obliquely extends upwards from inside to outside.

With the reinforcing plate located inside the groove, the groove is divided into a plurality of independent small cavities, and it is easy for the liquid electrolyte to congregate in the cavities. However, the reinforcing plate is beneficial for the liquid electrolyte to flow along the groove and the surfaces of the reinforcing plate to a bottom of the groove, and thus the liquid electrolyte may flow out through the liquid guiding slot.

In some embodiments, a plurality of the reinforcing plates are disposed within each groove.

In some embodiments, the battery spacer further includes a connecting member disposed on a top of the spacer body and configured to be connected with an insulating member via a snap connection.

In some embodiments, the connecting member includes two snap teeth opposed to each other in a lateral direction of the spacer body, and a plane in which the two snap teeth are located is orthogonal to the outer surface of the spacer body.

With the snap teeth mentioned above, the battery spacer may be stably fixed with the insulating member, thus further improving the stability of the position of the electric cores.

Embodiments of a second aspect of the present disclosure provide an electric core protection assembly. The assembly includes: a battery spacer according to above embodiments of the present disclosure and an insulating member connected with a top of the battery spacer via a snap connection.

In some embodiments, the battery spacer comprises two snap teeth disposed on the top thereof.

In some embodiments, the two snap teeth are opposed to each other in a lateral direction of the spacer body, and a plane in which the two snap teeth are located is orthogonal to the outer surface of the spacer body.

In some embodiments, the insulating member comprises two snap grooves formed in an upper surface of an end thereof and opposed to each other, in which the snap teeth are snapped into the snap grooves respectively such that the battery spacer is connected with the insulating member by a snap fit connection between the snap teeth and the snap grooves.

In some embodiments, the battery spacer is stably fixed with the insulating member without a relative movement therebetween, thereby further improving the stability of the position of the electric cores.

In some embodiments, at least a part of a side wall surface of the snap groove in the lateral direction of the spacer body is configured to have an arc shape and protrude outwards in the lateral direction of the spacer body, and the snap tooth has a shape matched with that of the snap groove.

Therefore, in assembling of the insulating member and the battery spacer, the snap teeth may be positioned by the arc shaped surfaces of the snap grooves initially, which can enhance the stability of the assembling as well as improve the efficiency of the assembling simultaneously.

Embodiments of a third aspect of the present disclosure provide a power battery. The power battery includes: a shell; a plurality of electric cores disposed in the shell and having a tab at an end thereof; and a battery spacer according to above embodiments of the present disclosure, in which the battery spacer is located between the tab and the shell, and the tab is received within a positioning area formed between adjacent protrusions such that the tab is held and positioned by the adjacent protrusions.

In some embodiments, the plurality of electric cores are disposed within the shell side by side.

In some embodiments, the tab is configured as a winding tab, and the positioning area has a shape matched with that of the winding tab.

Embodiments of a fourth aspect of the present disclosure provide a power battery. The power battery includes: a shell; a plurality of electric cores disposed in the shell and having a tab at an end thereof; a cover assembly configured to package the plurality of electric cores within the shell; and an electric core protection assembly according to above embodiments of the present disclosure, in which an insulating member is located between the cover assembly and the plurality of electric cores, the battery spacer is located between the tab and the shell, and the tab is received in a positioning area formed between adjacent protrusions, held and positioned by the adjacent protrusions.

In some embodiments, the plurality of electric cores are disposed within the shell side by side.

In some embodiments, the cover assembly includes a first electrode terminal and a second electrode terminal, in which the power battery further includes a first connector penetrated through the insulating member to connect the first electrode terminal with the tab, and a second connector penetrated through the insulating member to connect the second electrode terminal with the tab.

Additional aspects and advantages of the embodiments of the present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of the disclosure will become apparent and more readily appreciated from the following descriptions taken in conjunction with the drawings, in which.

DETAILED DESCRIPTION

Reference will be made in detail to embodiments of the present disclosure. The embodiments described herein with reference to the accompany drawings are explanatory and illustrative, and are used to generally understand the present disclosure. The embodiments shall not be construed to limit the present disclosure.

Figure 1:
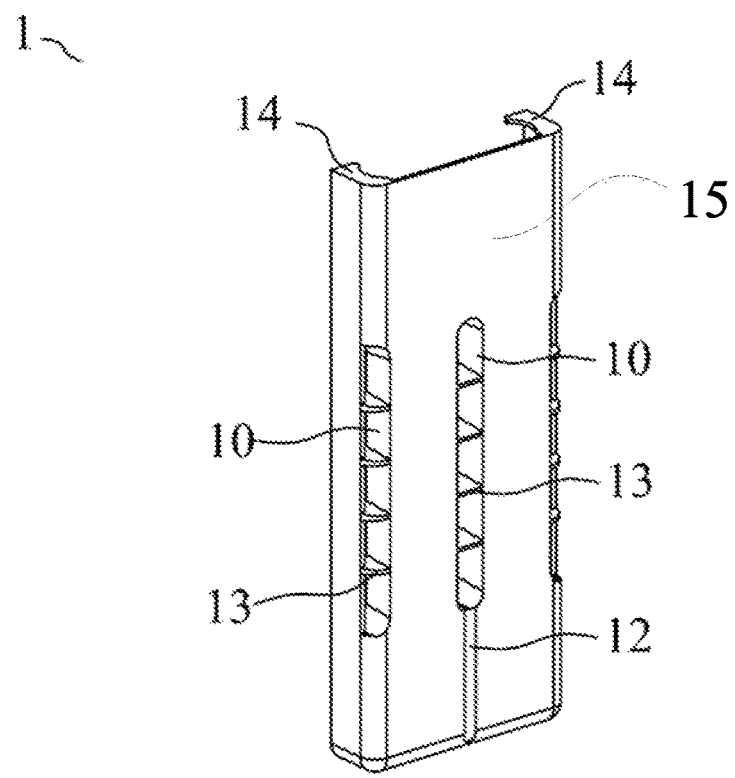
FIG. 1 is a front perspective view of a battery spacer according to an embodiment of the present disclosure.
Figure 2:
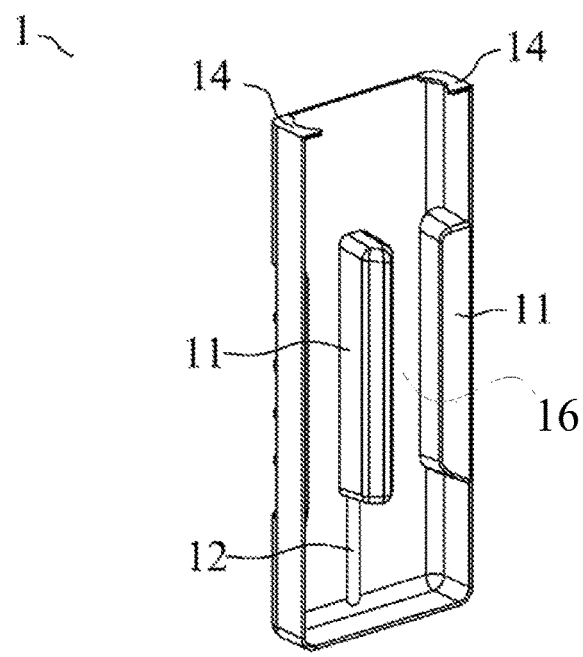
FIG. 2 is a rear perspective view of a battery spacer according to an embodiment of the present disclosure.

In the specification, unless specified or limited otherwise, it should be understood that, terms used to denote the position or positional relationship such as "length", "width", "upper", "lower", "top", "bottom", "inner", "outer" as well as derivative thereof should be construed to refer to the position or positional relationship as then described or as shown in FIG. 1 or FIG. 2. These relative terms are for convenience of description and do not require that the present disclosure be constructed or operated in a particular position. In the description of the present disclosure, unless specified or limited otherwise, "a plurality of" means two or more than two.

In the description of the present disclosure, unless specified or limited otherwise, terms such as "fixed", "mounted", "connected" may be understood broadly, such as permanent connection, detachable connection, or integrally connection. These having ordinary skills in the art should understand the specific meanings in the present disclosure according to specific situations.

In addition, terms such as "first" and "second" are used herein for purposes of description and are not intended to indicate or imply relative importance or significance.

A battery spacer according to embodiments of the present disclosure will be discussed below in details.

According to an embodiment of the present disclosure, the battery spacer 1 includes: a spacer body 15, a plurality of protrusions 11, a plurality of grooves 10 and a plurality of liquid guiding slots 12. Each protrusion 11 protrudes from an inner surface of the spacer body 15, extending in a longitudinal direction of the spacer body 15, and formed by recessing a portion of an outer surface of the spacer body 15. The plurality of grooves 10 are formed in the outer surface of the spacer body 15, and each groove 10 is corresponding to the protrusion 11 respectively and formed by recessing the portion of the outer surface of the spacer body 15. The plurality of liquid guiding slots 12 are formed in the outer surface of the spacer body 15 and extending from the grooves 10 to an edge of the spacer body 15 respectively.

In an embodiment of the present disclosure, the battery spacer 1 may be used in a battery with a square configuration, and the protrusions 11 protrude from the inner surface of the spacer body 15 may be used to position a winding tab 21 of a winding electric core 2 within the battery.

As known to those skilled in the related art, an anode sheet and a cathode sheet are aligned with each other with respect to a side thereof in a longitudinal direction of the anode sheet or the cathode sheet, and are staggered in a lateral direction of the anode sheet or the cathode sheet so as to expose tab areas without electrode materials (i.e., uncoated areas) in the anode sheet and the cathode sheet. Furthermore, a separator is disposed between the anode sheet and the cathode sheet, and the anode sheet and the cathode sheet are winded with respect to the separator to form the winding electric core, when a part with electrode materials (i.e., a coated area) in the anode sheet is completely covered by a part with electrode materials (i.e., a coated area) in the cathode sheet. And then middle parts of the tab areas without electrode materials (i.e., an uncoated anode sheet winded at one end of the electric core and an uncoated cathode sheet winded at the other end of the electric core) are pressed to obtain an anode tab and a cathode tab respectively. The anode tab and the cathode tab are winding tabs, and arc structures at both ends of the electric core are retained as transition areas so as to avoid breakage of an edge of the tab and reduce an impact of pressing on an arc edge of the electric core.

In embodiments of the present disclosure, at least one positioning area 16 is formed between the protrusions 11 to receive tabs 21. When the battery spacer 1 is used, each tab 21 is held in the positioning area 16. Therefore, a length of the protrusion 11 is not limited as long as the positioning area 16 formed between adjacent protrusions 11 is capable of receiving and positioning the tab 21. Those skilled in the related art can adjust the length of the protrusions 11 and a distance between the adjacent protrusions 11 according to sizes of different tabs.

The battery spacer 1 according to embodiments of the present disclosure is suitable to be used in a battery with a square configuration which is coupled with tabs 21 at a same end of the battery. In order to avoid a contact and a conduction between the tab 21 and the shell, the tab 21 is insulated from the shell by the battery spacer 1 according to embodiments of the present disclosure. As mentioned above, the groove 10 is formed in the outer surface of the spacer body 15 by recessing the portion of the outer surface of the spacer body 15 and corresponding to the protrusion 11. It can be understood that the groove 10 may be a blind groove.

In embodiments of the present disclosure, an inside and an outside of the battery spacer 1 are isolated. Therefore, when the liquid electrolyte is injected after the battery with the battery spacer 1 has been assembled, it is difficult for the liquid electrolyte outside of the battery spacer 1 to flow into the inside of the battery spacer 1 freely, and it is easy for the liquid electrolyte to congregate in the grooves 10 of the battery spacer 1. Moreover, the liquid guiding slot 12 is formed in the outer surface of the spacer body 15 and extending from the groove 10 to an edge of the spacer body 15 for a passage of the liquid electrolyte, and the liquid electrolyte congregated in the groove 10 can flow out along the liquid guiding slot 12, thus avoiding the local congregation of the liquid electrolyte in the battery. In addition, the number of the liquid guiding slots 12 is not limited, and may be one or more than one.

In some embodiments, the liquid guiding slot 12 may extend in the longitudinal direction of the spacer body 15.

In an embodiment of the present disclosure, in order to improve strength of the groove 10, the battery spacer 1 further includes a reinforcing plate 13 disposed within the groove 10. There may be a plurality of the reinforcing plates 13, and those skilled in the related art can adjust the number and locations of the reinforcing plates 13 according to actual applications. For example, under the premise of implementing better strength, the number of reinforcing plates 13 may be properly reduced, thereby reducing the weight of the battery spacer 1.

The reinforcing plates 13 may be disposed in any direction, but preferably in a lateral direction of the spacer body 15. That is, a plane in which the reinforcing plates 13 are located is orthogonal to an extending direction of the groove 10 or the protrusion 11.

In embodiments of the present disclosure, by disposing the reinforcing plates 13 within the grooves 10 respectively, each groove 10 is divided into a plurality of independent small cavities, thus greatly increasing a probability that the liquid electrolyte is congregated in the groove 10, i.e., in the plurality of independent small cavities. In an embodiment of the present disclosure, each reinforcing plate 13 has an upper surface obliquely extending downwards from inside to outside. Therefore, the liquid electrolyte fallen onto the upper surface of the reinforcing plates 13 may flow along the upper surface to an opening of the groove 10 and then flow downwards under the act of gravity, which may reduce the probability of congregation of the liquid electrolyte.

In some embodiments of the present disclosure, each reinforcing plate 13 has a lower surface obliquely extending upwards from inside to outside. Thus, each reinforcing plate 13 has a trapezoidal or triangular cross section in overall, and a thickness of each reinforcing plate 13 is decreased from inside to outside. Therefore, under the act of gravity, the liquid electrolyte fallen onto the upper surface of a first reinforcing plate 13 may flow outwards along the upper surface which obliquely extends downwards, to an edge of the first reinforcing plate 13, and flows from the edge to the lower surface of the first reinforcing plate 13, and then flows inwards along the lower surface which is obliquely extending upwards, to an inner wall of the groove 10 and further flows along the inner wall of the groove 10 to the upper surface of a second reinforcing plate 13 adjacent to the first reinforcing plate 13. In the above manner, the liquid electrolyte flows downwards continuously, until to a lower end of the groove 10, and then flows out via the liquid guiding slot 12 which is communicated to the lower end of the groove 10, thus avoiding the congregation of the liquid electrolyte in the groove 10.

The battery spacer 1 according to embodiments of the present disclosure is used to position the tab 21 so as to protect the tab 21 from the damage due to its own movement, thus improving a performance of the battery. The battery spacer 1 is usually assembled together with the insulating member 3 and disposed within the shell when used. In an embodiment of the present disclosure, in order to avoid the damage to the electric core 2 and tab 21 due to the relative movement between the battery spacer 1 and the insulating member 3, the battery spacer 1 further includes a connecting member, which is disposed on a top of the spacer body 15 and used to be connected with the insulating member 3 via a snap connection.

The connecting member mentioned above is used to fix the insulating member 3 with the battery spacer 1, and may have any suitable configurations. For example, one or more snap teeth 14 are provided on the top of the battery spacer 1, and the insulating member 3 includes one or more snap grooves 31 matched with the snap teeth 14 respectively. In another embodiment, one or more snap teeth 14 are provided in the insulating member 3, and the battery spacer 1 includes one or more snap grooves 31 on the top thereof, and the snap grooves 31 are matched with the snap teeth 14 respectively.

In embodiments of the present disclosure, the connecting member includes two snap teeth 14 opposed to each other in the lateral direction of the spacer body 15, and a plane in which the two snap teeth 14 are located is orthogonal to the outer surface of the spacer body 15.

With the snap teeth 14 mentioned above, the battery spacer 1 may be stably fixed with the insulating member 3, thus avoiding the damage to the electric core 2 and tab 21 due to the relative movement between the battery spacer 1 and the insulating member 3, and further improving the stability of the position of the electric cores.

Embodiments of the present disclosure also provide an electric core protection assembly. The assembly includes: an insulating member 3 and a battery spacer 1 according to above embodiments of the present disclosure. The insulating member 3 is connected with a top of the battery spacer 1 via a snap connection.

As mentioned above, the snap connection between the battery spacer 1 and the insulating member 3 may be achieved by a plurality of methods and structures. In embodiments of the present disclosure, the battery spacer 1 includes two snap teeth 14 on its top. The two snap teeth 14 are opposed to each other and disposed in a lateral direction of the spacer body 15, and a plane in which the two snap teeth 14 are located is orthogonal to an outer surface of the spacer body 15. The insulating member 3 includes two snap grooves 31, and the two snap grooves 31 are formed in an upper surface of an end of the insulating member 3 and opposed to each other. The snap teeth 14 are snapped into the snap grooves 31 respectively such that the battery spacer 1 is connected with the insulating member 3 by a snap fit connection between the snap teeth 14 and the snap grooves 31.

In this way, the battery spacer 1 and the insulating member 3 connected with each other via the snap connection are limited in longitudinal and lateral directions of the insulating member 3 and in the downwards extending longitudinal direction of the battery spacer 1, thus enhancing the relative stability between the battery spacer 1 and the insulating member 3.

In an embodiment of the present disclosure, at least a part of a side wall surface of the snap groove 31 in the lateral direction of the spacer body 15 is configured to have an arc shape and protrude outwards in the lateral direction of the spacer body 15, and the snap tooth 14 has a shape matched with that of the snap groove 31. With the above structure, in assembling of the insulating member 3 and the battery spacer 1, the snap teeth 14 may be positioned by the arc shaped surfaces of the snap grooves 31 initially, which can enhance the stability of the assembling as well as improve the efficiency of the assembling simultaneously.

Embodiments of the present disclosure also provide a power battery. The power battery includes: a shell, a plurality of electric cores 2 and a battery spacer 1 according to above embodiments of the present disclosure. The plurality of electric cores 2 are disposed in the shell and have a tab 21 at an end thereof. The battery spacer 1 is located between the tab 21 and the shell, and the tab 21 is received within a positioning area 16 formed between adjacent protrusions 11 such that the tab 21 can be held and positioned by the adjacent protrusions 11.

In some embodiments, the electric cores 2 are disposed within the shell side by side.

In some embodiments, the tabs 21 are configured as winding tabs. In one embodiment, the positioning area 16 formed between adjacent protrusions 11 has a shape matched with that of the winding tab, and thus the tabs 21 can be better positioned.

Based on the electric core protection assembly mentioned above, embodiments of the present disclosure also provide a power battery. The power battery includes: a shell, a plurality of electric cores 2, a cover assembly and an electric core protection assembly according to above embodiments of the present disclosure. The plurality of electric cores 2 are disposed in the shell and having a tab 21 at an end thereof. The cover assembly is configured to package the plurality of electric cores 2 within the shell. An insulating member 3 is located between the cover assembly and the plurality of electric cores 2, the battery spacer 1 is located between the tab 21 and the shell, and the tab 21 is received in a positioning area 16 formed between adjacent protrusions 11 of the battery spacer 1, held and positioned by the adjacent protrusions 11.

In some embodiments, the electric cores 2 are disposed within the shell side by side.

In some embodiments, the cover assembly may have any suitable configurations. For example, the cover assembly includes a first electrode terminal and a second electrode terminal, and the power battery further includes a first connector and a second connector, in which the first connector is penetrated through the insulating member 3 to connect the first electrode terminal with the tab 21, and the second connector is penetrated through the insulating member 3 to connect the second electrode terminal with the tab 21.

The battery spacer 1 and the electric core protection assembly according to preferred embodiments of the present disclosure will be described below with reference to FIGS. 1 to 6.

Figure 3:
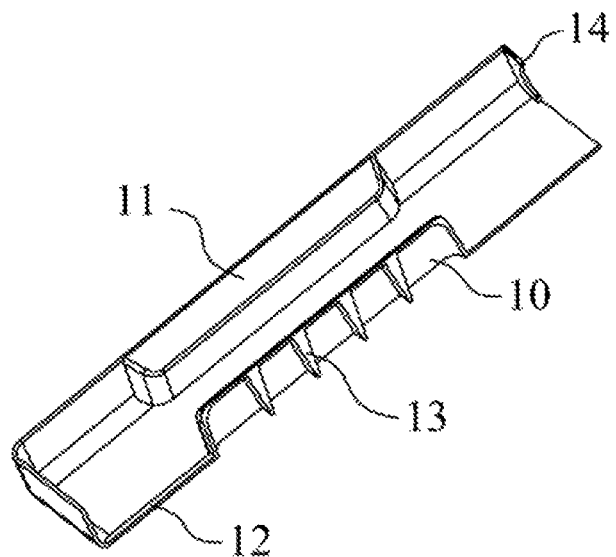
FIG. 3 is a sectional perspective view of a battery spacer according to an embodiment of the present disclosure.

As shown in FIGS. 1 to 3, the battery spacer 1 generally is a frame with an open top and an open inside wall. Three grooves 10 are formed in an outer surface of the spacer body 15 by recessing portions of the outer surface of the spacer body 15, and three protrusions 11 are formed on an inner surface of the spacer body 15 correspondingly. The three protrusions 11 extend in a longitudinal direction of the spacer body 15 of the battery spacer 1. A length of each protrusion 11 is matched with that of a pressed portion of a winding tab 21 of the electric core 2, and a distance between adjacent protrusions 11 is matched with a thickness of the pressed portion of the winding tab 21 of the electric core 2.

A positioning area 16 is formed between the adjacent protrusions 11, and thus the tab 21 of the electric core 2 can be received and positioned in the positioning area 16.

A liquid guiding slot 12 is formed in the outer surface of the spacer body 15 of the battery spacer 1. The liquid guiding slot 12 extends downwards from a lower end of the groove 10 located in the middle of the outer surface of the spacer body 15 to a lower edge of the spacer body 15 of the battery spacer 1.

A plurality of reinforcing plates 13 are disposed in each of the three grooves 10. And the plurality of reinforcing plates 13 are disposed in a lateral direction of the spacer body 15 in the battery spacer 1.

As shown in FIG. 3, each reinforcing plate 13 has a trapezoidal or triangular cross section in overall, and a thickness of each reinforcing plate 13 is decreased from inside to outside. Moreover, each reinforcing plate 13 has an upper surface obliquely extending downwards from inside to outside, and a lower surface obliquely extending upwards from inside to outside.

The battery spacer 1 includes two snap teeth 14 on its top, and the two snap teeth 14 are opposed to each other and disposed in the lateral direction of the spacer body 15 in the battery spacer 1. A plane in which the two snap teeth 14 are located is orthogonal to the outer surface of the spacer body 15.

Figure 4:
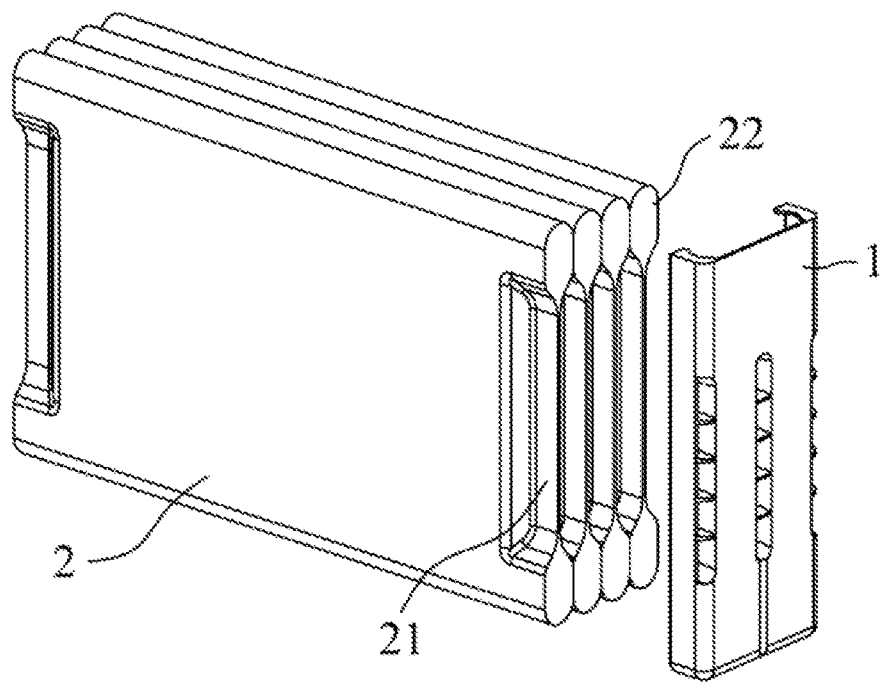
FIG. 4 is an exploded perspective view showing an assembling relationship between a battery spacer and electric cores according to an embodiment of the present disclosure.

As shown in FIG. 4, a plurality of electric cores 2 are disposed side by side. Each electric core 2 is configured as a winding electric core, and has a tab 21 at an end thereof. The tab 21 is configured as a winding tab, and has transition areas 22 having an arc shape at both ends thereof respectively.

In assembling of the battery spacer 1 with the plurality of the electric cores 2, the tabs 21 of the electric cores 2 which are disposed side by side are inserted into the positioning areas 16 formed by the protrusions 11 in the battery spacer 1, and held and positioned by the protrusions 11.

Figure 5:
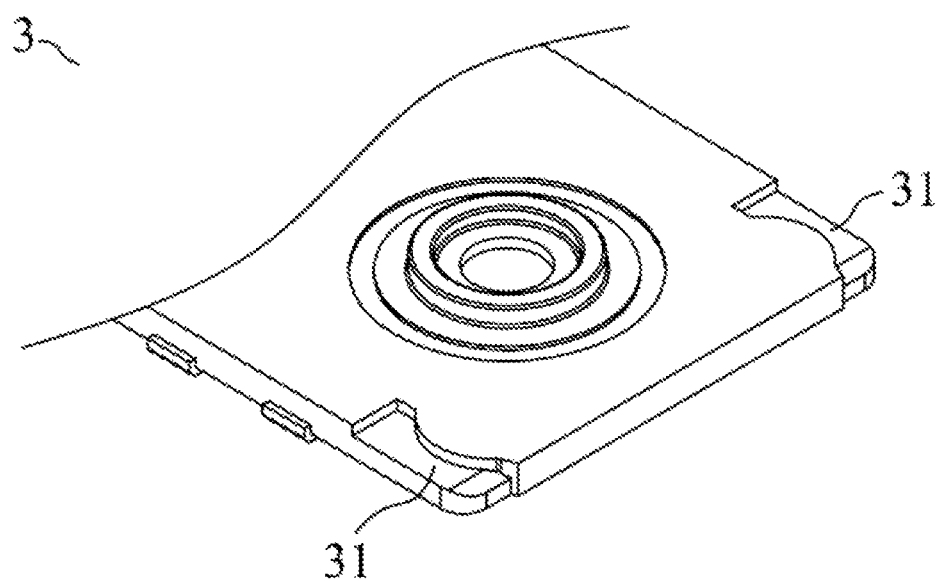
FIG. 5 is a partial perspective view of an insulating member of an electric core protection assembly according to an embodiment of the present disclosure.

As shown in FIG. 5, in the electric core protection assembly according to preferred embodiments of the present disclosure, the insulating member 3 includes two snap grooves 31 opposed to each other in an upper surface of its end which is configured to be connected with the battery spacer 1. The snap groove 31 is formed by recessing a portion of the upper surface of the insulating member 3.

At least a part of a side wall surface of the snap groove 31 in the lateral direction of the spacer body 15 is configured to have an arc shape and protrude outwards in the lateral direction of the spacer body 15.

Figure 6:
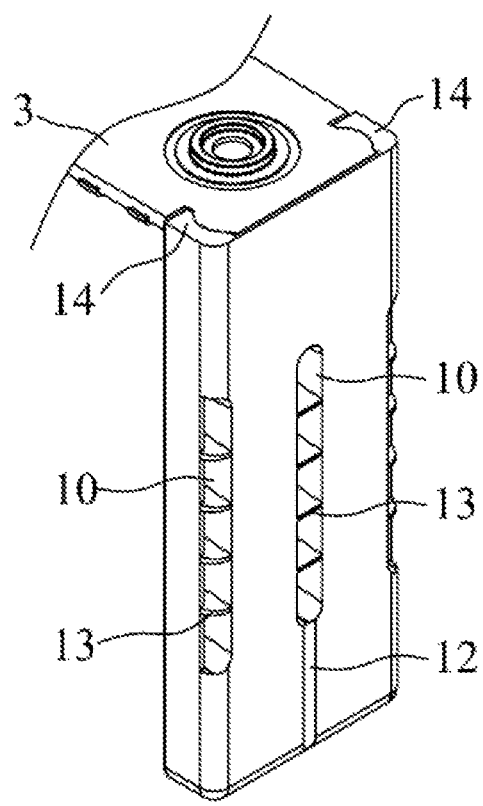
FIG. 6 is a perspective view showing an assembling relationship of an electric core protection assembly according to an embodiment of the present disclosure.

As shown in FIG. 6, the snap tooth 14 disposed on the top of the battery spacer 1 has a shape matched with that of the snap groove 31. The snap tooth 14 is snapped into the snap groove 31 such that the insulating member 3 can be fixed with the battery spacer 1.

With the battery spacer 1 according to above embodiments of the present disclosure, on one hand, the tabs 21 of the electric cores 2 can be positioned effectively so as to protect the electric cores 2 from damage due to its own movement. On the other hand, the liquid electrolyte can be effectively prevented from congregating in the battery spacer 1. Meanwhile, since the battery spacer 1 is stably fixed with the insulating member 3, the electric cores 2 can be protected from damage due to the relative movement between the battery spacer 1 and the insulating member 3.

Reference throughout this specification to "an embodiment," "some embodiments," "one embodiment", "another example," "an example," "a specific example," or "some examples," means that a particular feature, structure, material, or characteristic described in connection with the embodiment or example is included in at least one embodiment or example of the present disclosure. Thus, the appearances of the phrases such as "in some embodiments," "in one embodiment", "in an embodiment", "in another example," "in an example," "in a specific example," or "in some examples," in various places throughout this specification are not necessarily referring to the same embodiment or example of the present disclosure. Furthermore, the particular features, structures, materials, or characteristics may be combined in any suitable manner in one or more embodiments or examples.

Although explanatory embodiments have been shown and described, it would be appreciated by those skilled in the art that changes, alternatives, and modifications all falling into the scope of the claims and their equivalents may be made in the embodiments without departing from spirit and principles of the disclosure.

What is claimed is:

1. A battery spacer, comprising:
   a spacer body;
   a plurality of protrusions, each protrusion protruding from an inner surface of the spacer body, extending in a longitudinal direction of the spacer body, and formed by recessing a portion of an outer surface of the spacer body;
   a plurality of grooves formed in the outer surface of the spacer body, each groove corresponding to one of the plurality of protrusions respectively and formed by recessing the portion of the outer surface of the spacer body;
   at least one reinforcing plate disposed within at least one of the plurality of grooves; and
   a plurality of liquid guiding slots formed in the outer surface of the spacer body and extending from the plurality of grooves to an edge of the spacer body respectively.

2. The battery spacer of claim 1, wherein the plurality of slots extend in the longitudinal direction of the spacer body.

3. The battery spacer of claim 1, wherein the at least one reinforcing plate is disposed in a lateral direction of the spacer body, and defines an upper surface obliquely extending downwards from inside to outside and a lower surface.

4. The battery spacer of claim 3, wherein the lower surface of the at least one reinforcing plate obliquely extends upwards from inside to outside.

5. The battery spacer of claim 1, further comprising a plurality of reinforcing plates disposed within each groove.

6. The battery spacer of claim 1, further comprising a connecting member disposed on a top of the spacer body and configured to be connected with an insulating member via a snap connection.

7. The battery spacer of claim 6, wherein the connecting member comprises two snap teeth opposed to each other in a lateral direction of the spacer body, and a plane in which the two snap teeth are located is orthogonal to the outer surface of the spacer body.

8. An electric core protection assembly, comprising:
   a battery spacer according to claim 1; and
   an insulating member connected with a top of the battery spacer via a snap connection.

9. The electric core protection assembly of claim 8, wherein the battery spacer comprises two snap teeth disposed on the top thereof.

10. The electric core protection assembly of claim 9, wherein the two snap teeth are opposed to each other in a lateral direction of the spacer body, and a plane in which the two snap teeth are located is orthogonal to the outer surface of the spacer body.

11. The electric core protection assembly of claim 10, wherein the insulating member comprises two snap grooves formed in an upper surface of an end thereof and opposed to each other,
wherein the snap teeth are snapped into the snap grooves respectively such that the battery spacer is connected with the insulating member by a snap fit connection between the snap teeth and the snap grooves.

12. The electric core protection assembly of claim 11, wherein at least a part of a side wall surface of the snap groove in the lateral direction of the spacer body is configured to have an arc shape and protrude outwards in the lateral direction of the spacer body, and the snap tooth has a shape matched with that of the snap groove.

13. A power battery, comprising:
a plurality of electric cores having a tab at an end thereof; and
a battery spacer according to claim 1,
wherein the tab is received within a positioning area formed between adjacent protrusions such that the tab is held and positioned by the adjacent protrusions.

14. The power battery of claim 13, wherein the plurality of electric cores are disposed side by side.

15. The power battery of claim 13, wherein the tab is configured as a winding tab, and the positioning area has a shape matched with that of the winding tab.

16. A power battery, comprising:
a plurality of electric cores having a tab at an end thereof; and
an electric core protection assembly according to claim 8,
wherein the tab is received in a positioning area formed between adjacent protrusions, held and positioned by the adjacent protrusions.

17. An electric core protection assembly, comprising:
a battery spacer comprising
a spacer body;
a plurality of protrusions, each protrusion protruding from an inner surface of the spacer body, extending in a longitudinal direction of the spacer body;
a plurality of grooves formed in the outer surface of the spacer body;
at least one reinforcing plate disposed within at least one of the plurality of grooves;
a plurality of liquid guiding slots formed in the outer surface of the spacer body and extending from the plurality of grooves to an edge of the spacer body respectively; and
an insulating member connected with a top of the battery spacer via a snap connection.

18. A power battery, comprising:
a plurality of electric cores having a tab at an end thereof; and
a battery spacer comprising
a spacer body;
a plurality of protrusions, each protrusion protruding from an inner surface of the spacer body, extending in a longitudinal direction of the spacer body;
a plurality of grooves formed in the outer surface of the spacer body;
at least one reinforcing plate disposed within at least one of the plurality of grooves;
a plurality of liquid guiding slots formed in the outer surface of the spacer body and extending from the plurality of grooves to an edge of the spacer body respectively,
wherein the tab is received within a positioning area formed between adjacent protrusions such that the tab is held and positioned by the adjacent protrusions.

* * * * *